United States Patent
Ohara et al.

(10) Patent No.: US 7,220,512 B2
(45) Date of Patent: May 22, 2007

(54) SEPARATOR PLATE FOR POLYMER ELECTROLYTE FUEL CELL AND POLYMER ELECTROLYTE FUEL CELL USING THE SAME

(75) Inventors: Hideo Ohara, Katano (JP); Kazuhito Hatoh, Osaka (JP); Nobuhiro Hase, Mino (JP); Hiroki Kusakabe, Sakai (JP); Katsuzou Kokawa, Nara (JP); Takayuki Urata, Hyogo (JP); Toshihiro Matsumoto, Takatsuki (JP); Shinsuke Takeguchi, Osaka (JP); Soichi Shibata, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 606 days.

(21) Appl. No.: 10/685,698

(22) Filed: Oct. 16, 2003

(65) Prior Publication Data

US 2004/0131918 A1    Jul. 8, 2004

(30) Foreign Application Priority Data

Oct. 16, 2002  (JP)  ............................. 2002-301811

(51) Int. Cl.
*H01M 2/14* (2006.01)

(52) U.S. Cl. ..................... 429/38; 429/34; 429/35; 429/36; 429/39

(58) Field of Classification Search ................... 429/34, 429/35, 36, 38, 39

See application file for complete search history.

(56) References Cited

U.S. PATENT DOCUMENTS 5,750,281 A  *  5/1998  Washington et al. .......... 429/39

FOREIGN PATENT DOCUMENTS

| EP | 1 020 941 A2 | 7/2000 |
| JP | 10074527 A | 3/1998 |
| WO | WO 01/80339 A2 | 10/2001 |

* cited by examiner

*Primary Examiner*—Bruce F. Bell
(74) *Attorney, Agent, or Firm*—McDermott Will & Emery LLP

(57) ABSTRACT

A separator plate for a polymer electrolyte fuel cell having excellent conductivity and moldability is provided. The separator plate is injection molded, using different compounds for molding the portion that requires conductivity and the portion that does not require conductivity. The separator plate comprises: an electronic conductor portion containing conductive carbon; and an insulating portion surrounding the electronic conductor portion. The electronic conductor portion has a first flow channel of a gas or cooling water on one side and has a second flow channel of a gas or cooling water on the other side.

14 Claims, 16 Drawing Sheets

F I G. 1 3
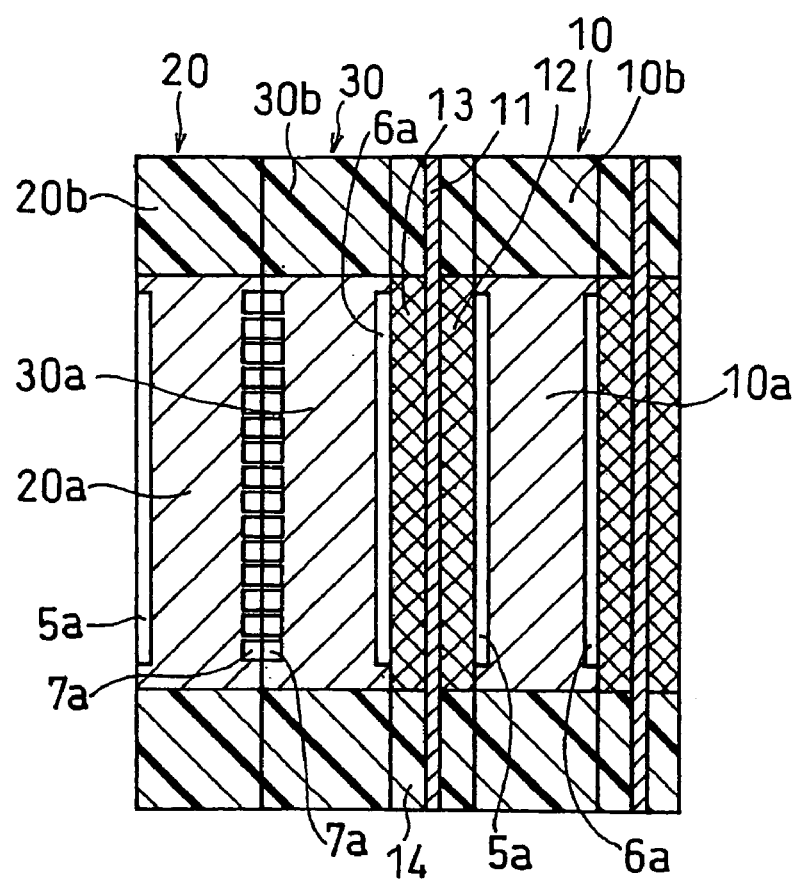

SEPARATOR PLATE FOR POLYMER ELECTROLYTE FUEL CELL AND POLYMER ELECTROLYTE FUEL CELL USING THE SAME

BACKGROUND OF THE INVENTION

The present invention relates to a polymer electrolyte fuel cell for use in portable power sources, electric vehicle power sources, domestic cogeneration systems or the like. More specifically, the present invention pertains to a conductive separator plate used therein.

A fuel cell comprising a polymer electrolyte membrane generates electric power and heat simultaneously by electrochemically reacting a fuel gas containing hydrogen with an oxidant gas containing oxygen such as air. The fuel cell comprises a polymer electrolyte membrane that selectively transports hydrogen ions and a pair of electrodes formed on both sides of the polymer electrolyte membrane, i.e., an anode and a cathode. The electrode is composed of a catalyst layer formed on each side of the polymer electrolyte membrane and a gas diffusion layer formed on the outer face of the catalyst layer. The catalyst layer is composed mainly of a carbon powder carrying a platinum group metal catalyst, and the gas diffusion layer has excellent gas permeability and electronic conductivity.

In order to prevent the supplied fuel gas and oxidant gas from leaking out or prevent these two kinds of gases from mixing together, gas sealing materials or gaskets are arranged around the electrodes so as to sandwich the polymer electrolyte membrane. The gas sealing materials or gaskets are combined integrally with the electrodes and the polymer electrolyte membrane beforehand. This is called an "MEA" (electrolyte membrane-electrode assembly).

Disposed outside the MEA are conductive separator plates for mechanically securing the MEA and for connecting adjacent MEAs electrically in series. The separator plates have a gas flow channel for supplying a reactive gas to the electrode surface and removing a generated gas and an excess gas. Although the gas flow channel may be provided independently of the separator plate, grooves are usually formed on the surface of the separator plate as the gas flow channel.

In order to supply the reactive gas to the grooves, it is necessary to use a piping jig which, depending on the number of the separator plates, branches off from the supply pipe of the reactive gas into the grooves of the separator plates. This jig is called a "manifold", and the above-described type, connecting the supply pipe of the fuel gas from outside of the separator plates with the separator plates, is called an "external manifold". A manifold having a simpler structure is called an "internal manifold". The internal manifold comprises through holes that are formed in the separator plates with the gas flow channel. The through holes are connected to the inlet and outlet of the gas flow channel so that the reactive gas is supplied directly from these holes to the gas flow channel.

Since the fuel cell generates heat during operation, it is necessary to cool the fuel cell with cooling water or the like, in order to keep the cell under good temperature conditions. A cooling water flow channel is usually provided every one to three unit cells. Normally, the cooling water flow channel is often provided on the backside of the separator plate to form a cooling section. In a general structure of the fuel cell, the MEAs and the separator plates are alternately stacked to form a stack of 10 to 200 unit cells, a current collector plate and an insulating plate are attached to each end of the cell stack, and the resultant stack is sandwiched between end plates and clamped with clamping bolts from both ends.

The separator plates of such a polymer electrolyte fuel cell need to have high conductivity, high gas tightness, and high corrosion resistance to electrode reactions. Therefore, conventional separator plates have usually been formed from conductive carbon materials such as glassy carbon and expanded graphite, and the gas flow channel has been made by cutting or grinding the surface thereof or by molding in the case of expanded graphite.

Recently, separator plates that are compression molded of a mixture of graphite and resin for cost reduction are also in use. Further, an attempt is being made to injection mold separator plates out of a mixture of graphite and resin.

As the production method of separator plates, there is a proposal to injection mold separator plates by melting and kneading a compound of a mixture of graphite and a thermoplastic resin in an injection molding machine and injecting the compound into a mold (molding dies). However, since the separator plates need to have high electronic conductivity, the ratio of the conductive filler contained in the compound becomes high. In this case, the compound has high heat conductivity and low fluidity when melted, so that the moldability is significantly impaired, leading to such problems as insufficient filling of the compound and strength shortage of the welded parts. Another problem is that the performance of the fuel cell is deteriorated due to the limitations on the flow channel shape of the separator plate, the decrease in the strength of the manifold apertures arranged around the flow channel, the decline in gas tightness, etc.

In order to solve these problems associated with the conventional separator plates, it is an object of the present invention to provide a separator plate for a polymer electrolyte fuel cell having excellent conductivity and moldability. It is another object of the present invention to provide a polymer electrolyte fuel cell having excellent cell characteristics by using the separator plate for a polymer electrolyte fuel cell having excellent conductivity and moldability.

BRIEF SUMMARY OF THE INVENTION

The present invention is based on the findings that the use of different compounds for molding the portion of a separator plate that requires electronic conductivity and the portion that does not require electronic conductivity makes it possible to simultaneously obtain excellent moldability and electronic conductivity.

A separator plate for a polymer electrolyte fuel cell in accordance with the present invention comprises: an electronic conductor portion containing conductive carbon; and an insulating portion surrounding the electronic conductor portion, the electronic conductor portion having a first flow channel of a gas or cooling water on one side and having a second flow channel of a gas or cooling water on the other side.

It is preferable that the electronic conductor portion and the insulating portion be molded integrally and that the insulating portion have a pair of first manifold apertures communicating with the first flow channel and a pair of second manifold apertures communicating with the second flow channel.

It is preferable that the separator plate further comprise a third portion between the electronic conductor portion and the insulating portion.

It is preferable that the third portion comprise an adhesive material.

It is preferable that the third portion comprise a mixture of a material used in the electronic conductor portion and a material used in the insulating portion.

It is preferable that the electronic conductor portion and the insulating portion be injection molded.

It is preferable that the electronic conductor portion comprise a mixture of an inorganic conductive filler and a resin.

It is preferable that the insulating portion comprise a gas-tight elastic material.

It is preferable that the insulating portion comprise a thermoplastic resin.

It is preferable that the electronic conductor portion and the insulating portion comprise a resin having the same main molecular structure.

It is preferable that the resin having the same main molecular structure be polyphenylene sulfide.

It is preferable that the joint between the electronic conductor portion and the insulating portion have a cross-section which comprises a combination of a projection and a depression.

It is preferable that the projection be formed on the electronic conductor portion.

It is preferable that the electronic conductor portion and the insulating portion be joined by inserting one of the electronic conductor portion and the insulating portion into a hole formed in the other portion.

It is preferable that the hole be formed in the electronic conductor portion.

A polymer electrolyte fuel cell in accordance with the present invention comprises a cell stack, the cell stack including: a plurality of membrane electrode assemblies, each comprising a hydrogen-ion conductive polymer electrolyte membrane and an anode and a cathode sandwiching the electrolyte membrane; and a plurality of the separator plates that are stacked alternately with the membrane electrode assemblies, wherein each of the separator plates comprises: an electronic conductor portion containing conductive carbon; and an insulating portion surrounding the electronic conductor portion, and the electronic conductor portion has a first flow channel of a gas or cooling water on one side and has a second flow channel of a gas or cooling water on the other side.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWING

FIG. 13 is a view illustrating the structure of a fuel cell in EXAMPLES 1 and 2 of the present invention.

DETAILED DESCRIPTION OF THE INVENTION

The separator plate for a polymer electrolyte fuel cell in accordance with the present invention comprises an electronic conductor portion containing conductive carbon and an insulating portion.

Examples of the resin that may be used for the electronic conductor portion include polyethylene, polystyrene, polypropylene, methacrylic resin, polyethylene terephthalate, polycarbonate, polyamide, polyimide, polyvinyl alcohol, polyphenylene sulfide, polyether ketone, polyether imide, fluorocarbon resin, ester resin, liquid crystal polymer, aromatic polyester, polyacetal, and polyphenylene ether.

Examples of the resin that may be used for the insulating portion include PPS resin, polyethylene, vinyl chloride resin, polystylene, AS resin, ABS resin, methyl methacrylate resin, polyamide resin, modified polyphenylene ether, ultra-high molecular weight polyethylene, polymethyl pentene, syndiotactic polystyrene, polysulphone, polyether sulphone, polyphthalamide, polycyclohexylene dimethylene terephthalate, polyether imide, polyether ether ketone, polyimide, liquid crystal polymer, fluorocarbon resin, styrene type thermoplastic elastomer, olefin type thermoplastic elastomer, polyurethane type thermoplastic elastomer, vinyl chloride type thermoplastic elastomer, polyamide type thermoplastic elastomer, styrene-butadiene type thermoplastic elastomer, nitrile type elastomer, and glass-reinforced polyester type elastomer.

It is preferable to provide a third portion between the electronic conductor portion and the insulating portion. The material of the third portion is preferably a mixture of at least a material such as a resin used in the electronic conductor portion and a material such as a resin used in the insulating portion. It is particularly preferable that each of the electronic conductor portion and the insulating portion comprise one of the above-listed resins and that the third portion comprises a mixture of these two resins.

Embodiments of the present invention are described below with reference to drawings.

Embodiment 1

Figure 3:
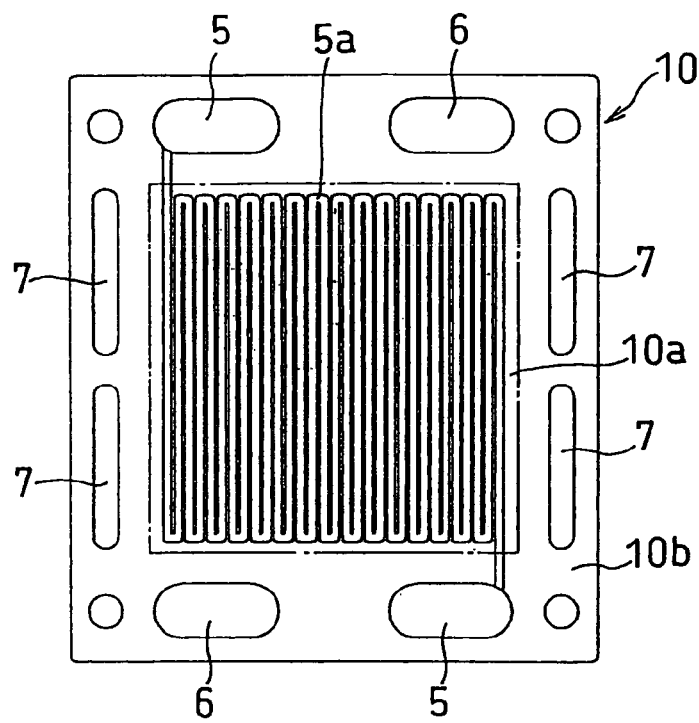
FIG. 3 is a front view of a separator plate in EMBODIMENT 1 of the present invention.
Figure 4:
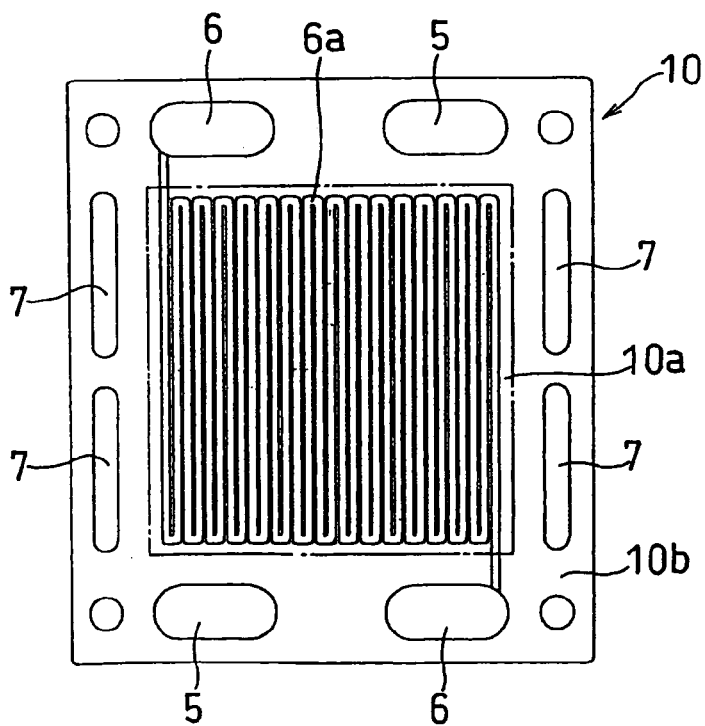
FIG. 4 is a back view of the separator plate in EMBODIMENT 1 of the present invention.

FIGS. 3 and 4 illustrate a separator plate 10 which serves both as an anode-side separator plate and a cathode-side separator plate.

The separator plate 10 is composed of: an electronic conductor portion 10a opposed to an anode or a cathode; and an insulating portion 10b surrounding the electronic conductor portion 10a. The insulating portion 10b has a pair of oxidant gas manifold apertures 5, a pair of fuel gas manifold apertures 6, and a pair of cooling water manifold apertures 7. The electronic conductor portion 10a has, on the cathode facing side, an oxidant gas flow channel 5a communicating with the pair of oxidant gas manifold apertures 5, as illustrated in FIG. 3. On the anode facing side, which is the backside thereof, the electronic conductor portion 10a has a fuel gas flow channel 6a communicating with the pair of fuel gas manifold apertures 6, as illustrated in FIG. 4.

Figure 5:
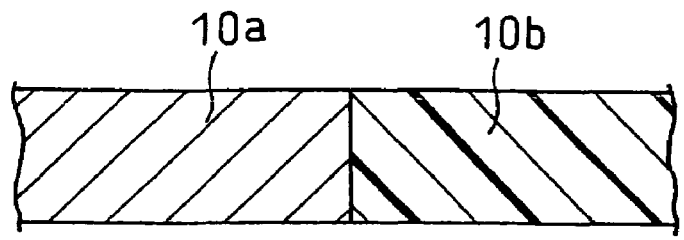
FIG. 5 is a cross-sectional view of the vicinity of the interface between an electronic conductor portion and an insulating portion of the separator plate of EMBODIMENT 1.
Figure 6:
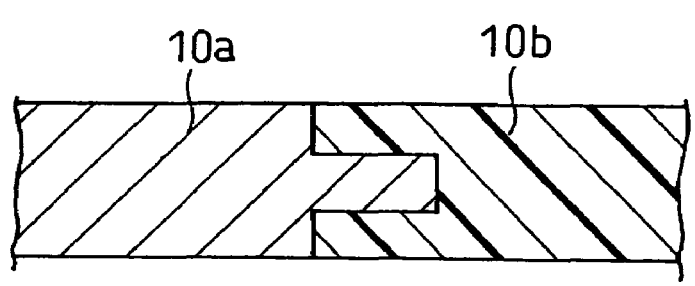
FIG. 6 is a cross-sectional view of the vicinity of the interface between an electronic conductor portion and an insulating portion of a second separator plate of EMBODIMENT 1.
Figure 7:
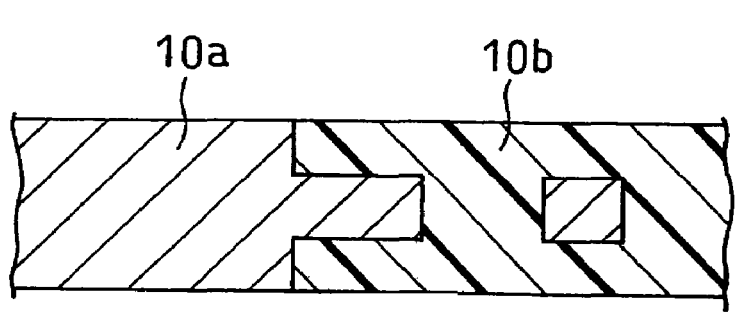
FIG. 7 is a cross-sectional view of the vicinity of the interface between an electronic conductor portion and an insulating portion of a third separator plate of EMBODIMENT 1.
Figure 8:
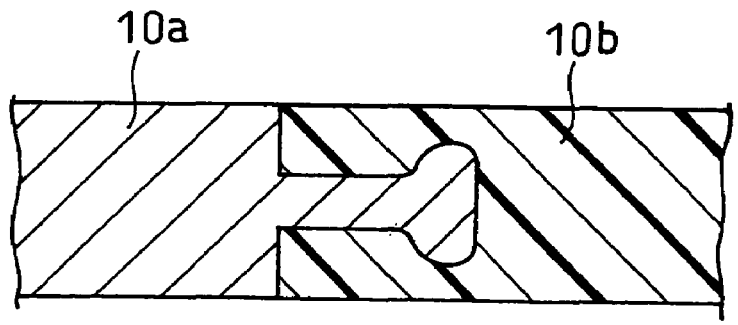
FIG. 8 is a cross-sectional view of the vicinity of the interface between an electronic conductor portion and an insulating portion of a fourth separator plate of EMBODIMENT 1.

The electronic conductor portion 10a and the insulating portion 10b are joined in such a form as illustrated in FIG. 5, in which the two portions are butt-joined in a straight line. That is, the face perpendicular to the plane of the electronic conductor plate 10a and the face perpendicular to the plane of the insulating plate 10b are joined. In addition, it is also possible to join them as illustrated in FIGS. 6 to 8. In FIG. 6, the projected part of the electronic conductor portion engages with the depressed part of the insulating portion to form a joint. In FIG. 7, the electronic conductor portion is partially perforated to form a joint. In this case, the perforated portion (hole) of the electronic conductor portion 10a is filled with the insulating plate 10b to enhance the strength of the joint. In FIG. 8, the joint portion of the electronic conductor portion is undercut.

Embodiment 2

FIGS. 9 to 12 illustrate a cathode-side separator plate 20 and an anode-side separator plate 30 which constitute a composite separator plate having a cooling section.

The cathode-side separator plate 20 is composed of: an electronic conductor portion 20a opposed to a cathode; and an insulating portion 20b surrounding the electronic conductor portion 20a.

Figure 9:
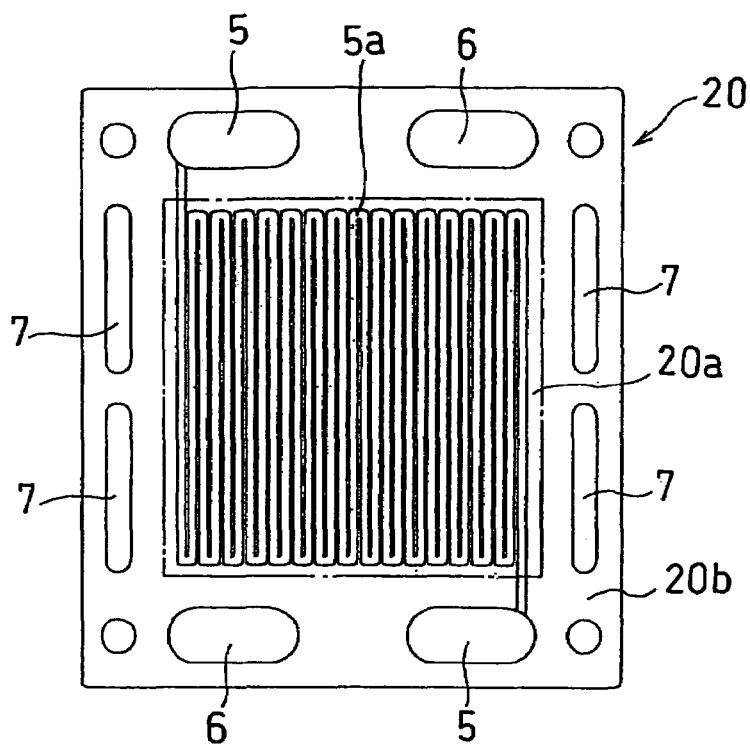
FIG. 9 is a front view of a cathode-side separator plate in EMBODIMENT 2 of the present invention.
Figure 10:
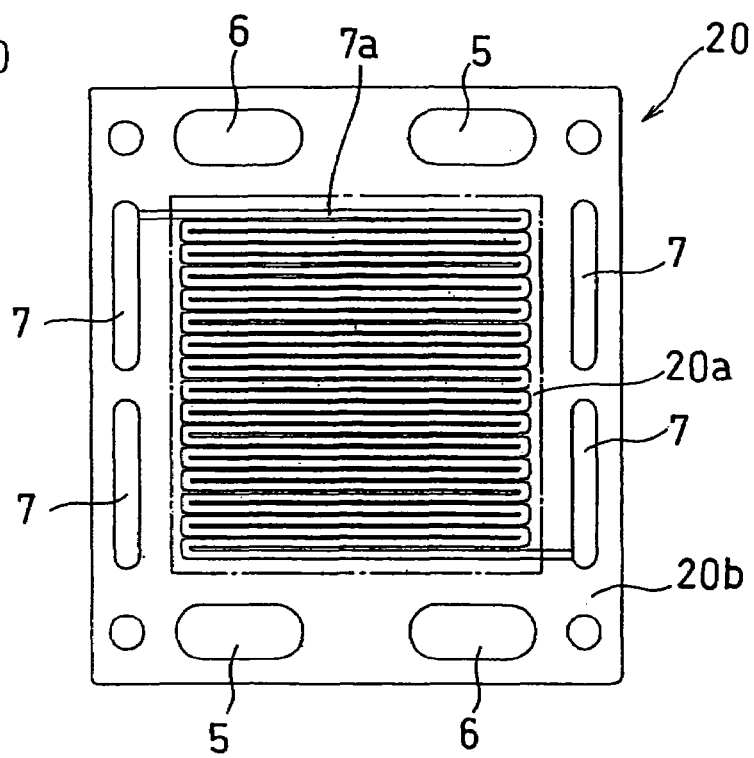
FIG. 10 is a back view of the cathode-side separator plate in EMBODIMENT 2 of the present invention.

The electronic conductor portion 20a has, on the cathode facing side, an oxidant gas flow channel 5a communicating with a pair of oxidant gas manifold apertures 5, as illustrated in FIG. 9. On the backside thereof, the electronic conductor portion 20a has a cooling water flow channel 7a communicating with a pair of cooling water manifold apertures 7, as illustrated in FIG. 10. The direction of the oxidant gas flow channel 5a and the direction of the cooling water flow channel 7a cross each other at right angles.

The anode-side separator plate 30 is composed of: an electronic conductor portion 30a opposed to an anode; and an insulating portion 30b surrounding the electronic conductor portion 30a.

Figure 11:
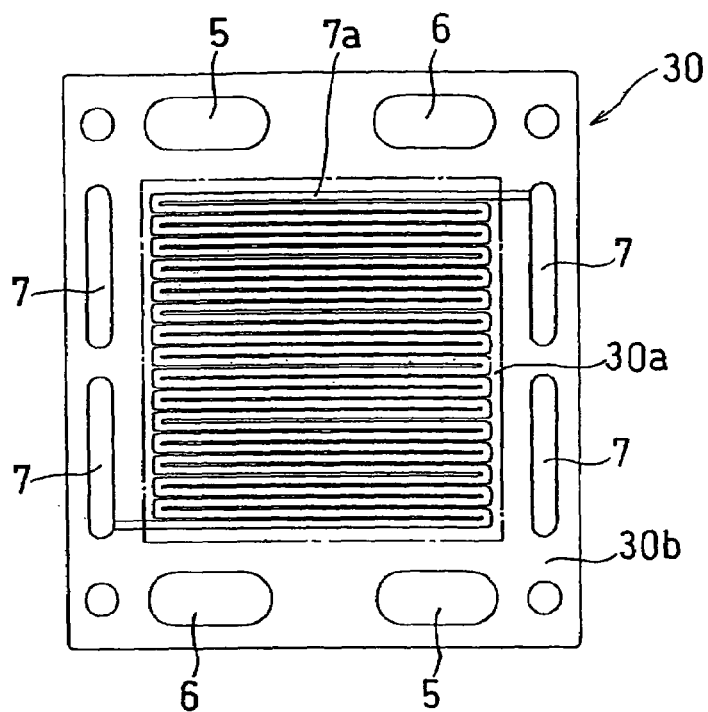
FIG. 11 is a front view of an anode-side separator plate in EMBODIMENT 2 of the present invention.
Figure 12:
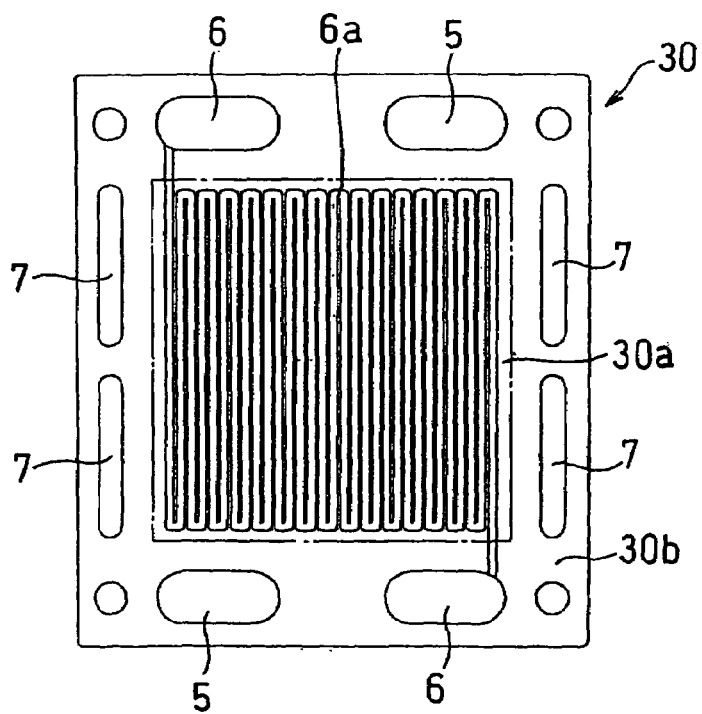
FIG. 12 is a back view of the anode-side separator plate in EMBODIMENT 2 of the present invention.

The electronic conductor portion 30a has, on the anode facing side, a fuel gas flow channel 6a communicating with a pair of fuel gas manifold apertures 6, as illustrated in FIG. 12. On the backside thereof, the electronic conductor portion 30a has a cooling water flow channel 7a communicating with a pair of cooling water manifold apertures 7, as illustrated in FIG. 11. The direction of the fuel gas flow channel 6a and the direction of the cooling water flow channel 7a cross each other at right angles.

When the cathode-side separator plate 20 and the anode-side separator plate 30 are combined together such that their cooling water flow channels faced each other, the combined cooling water flow channels 7a form one cooling water flow channel, so that a cooling section is provided inside the separator plates.

As in EMBODIMENTS 1 and 2, by providing the electronic conductor portion for the anode or cathode facing portion that needs conductivity, and by providing the insulating portion for the portion that does not need conductivity, it is possible to obtain excellent moldability and conductivity.

Embodiment 3

Figure 16:
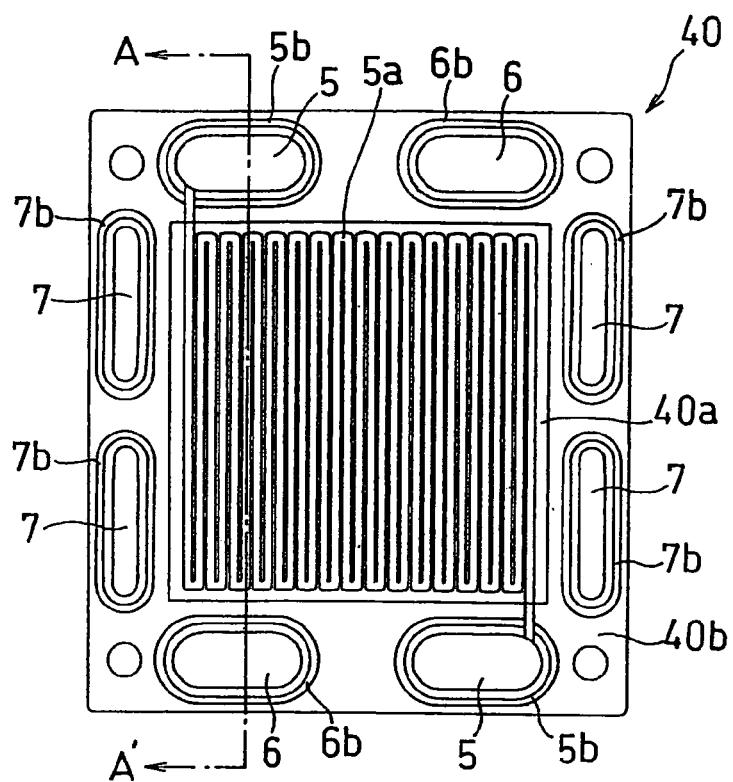
FIG. 16 is a front view of a separator plate in EMBODIEMNT 3 of the present invention.
Figure 17:
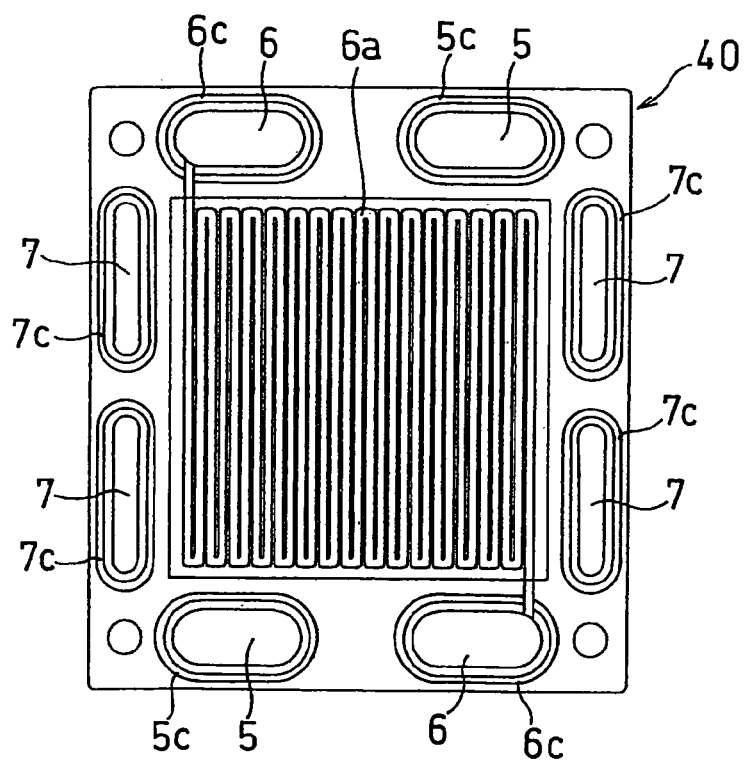
FIG. 17 is a back view of the separator plate in EMBODIMENT 3 of the present invention.
Figure 18:
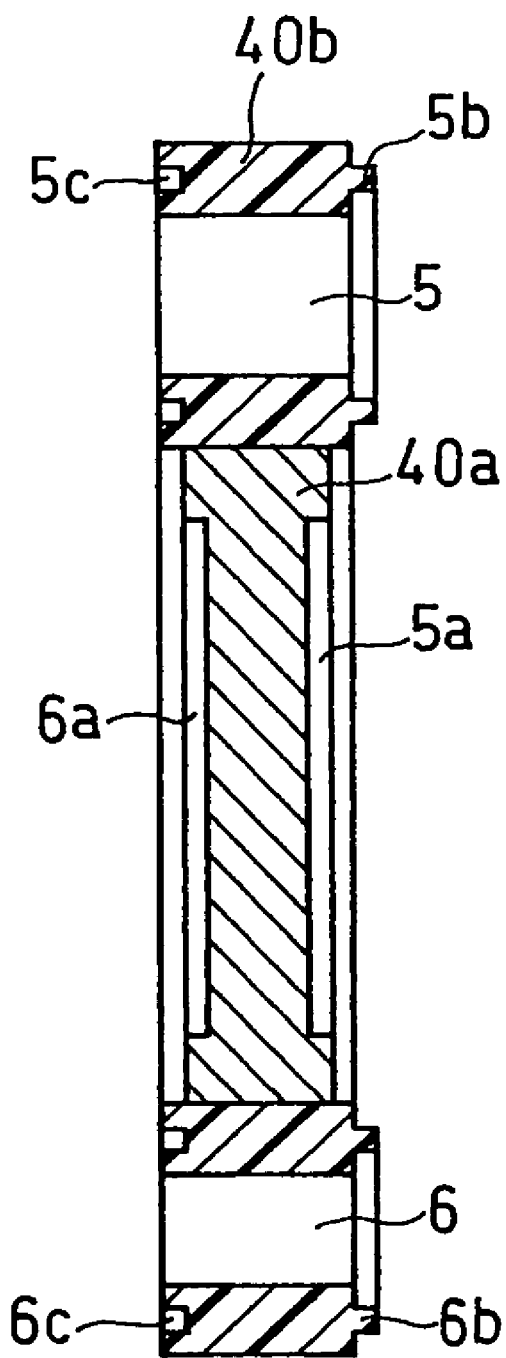
FIG. 18 is a cross-sectional view taken on line A–A' of FIG. 16.

FIGS. 16 and 17 illustrate a separator plate 40 which serves both as an anode-side separator plate and a cathode-side separator plate. The separator plate 40 has ribs surrounding each of oxidant gas manifold apertures, fuel gas manifold apertures and cooling water manifold apertures on one side, and has corresponding grooves for receiving the ribs on the other side. FIG. 18 is a cross-sectional view taken on line A–A' of FIG. 16.

The separator plate 40 is composed of: an electronic conductor portion 40a opposed to an anode or a cathode; and an insulating portion 40b surrounding the electronic conductor portion 40a. On the cathode side of the insulating portion 40b, ribs 5b, 6b and 7b are formed around oxidant gas manifold apertures 5, fuel gas manifold apertures 6, and cooling water manifold apertures 7, respectively. On the backside (anode side) of the insulating portion 40b, grooves 5c, 6c and 7c are formed around the oxidant gas manifold apertures 5, the fuel gas manifold apertures 6, and the cooling water manifold apertures 7, respectively.

Since the insulating portion, made of a gas-tight elastic material, can serve as a gasket, the electronic conductor portion 40a is so configured that its height is slightly lower than the insulating portion 40b. The use of this separator plate eliminates the need to use gaskets. Also, by providing the ribs or grooves for the parts of the insulating portion that need to be sealed and causing them to fit to the ribs or grooves of the adjacent separator plate, it is possible to ensure the sealing characteristics of the separator plate.

Embodiment 4

Figure 20:
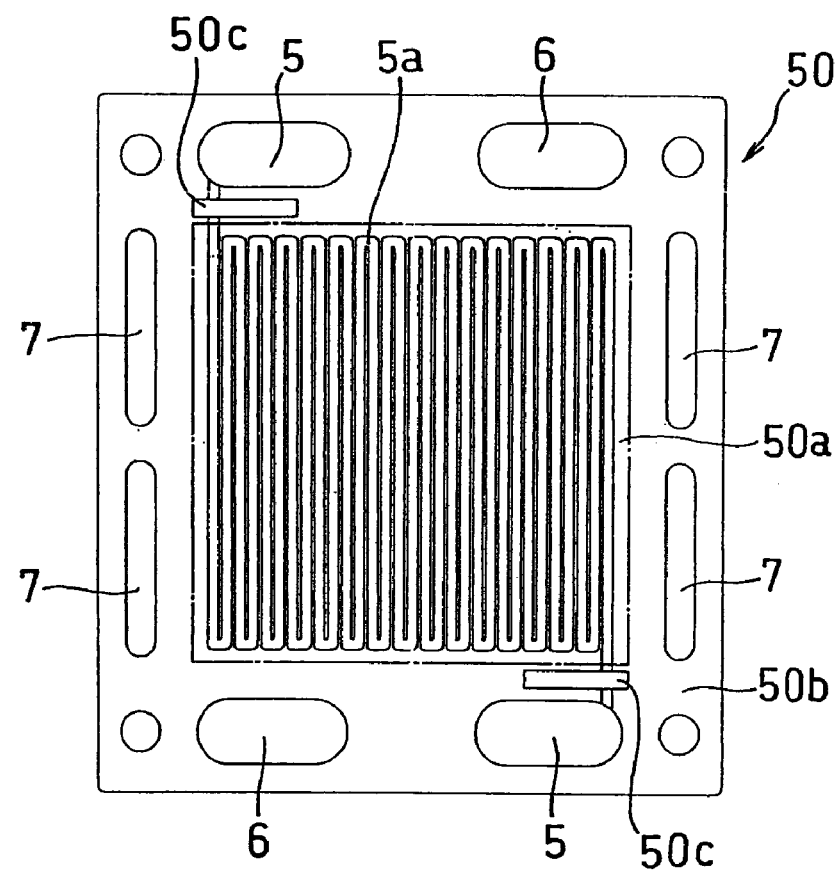
FIG. 20 is a front view of a separator plate in EMBODIMENT 4 of the present invention.
Figure 21:
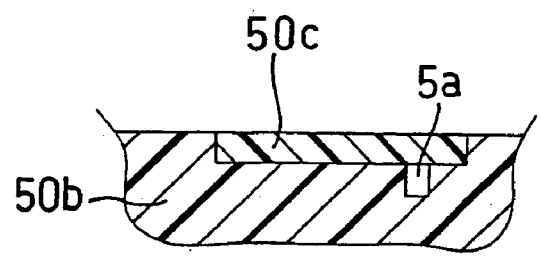
FIG. 21 is a part of a cross-sectional view of the vicinity of a plate member of FIG. 20.

FIG. 20 illustrates a separator plate 50 which has plate members and serves both as an anode-side separator plate and a cathode-side separator plate. Of an oxidant or fuel gas flow channel communicating with a pair of oxidant or fuel gas manifold apertures, each plate member covers a part of the flow channel formed in the insulating portion. It is noted that the gas flow channel is connected to the pair of manifold apertures via a connecting channel 70 formed on the insulating portion, and each plate member covers a part of this connecting channel. FIG. 21 is a part of a cross-sectional view of the vicinity of the plate member.

The separator plate 50 is composed of: an electronic conductor portion 50a opposed to an anode or a cathode; and an insulating portion 50b surrounding the electronic conductor portion 50a. Of an oxidant gas flow channel 5a communicating with a pair of oxidant gas manifold apertures 5, a part of the gas flow channel 5a in the insulating portion 50b is covered by each of plate members 50c. Also, on the backside, of a fuel gas flow channel communicating with a pair of fuel gas manifold apertures, a part of the fuel gas flow channel in the insulating portion is covered by each of plate members (this is not shown in FIG. 20).

By employing this structure, the gaskets adjacent to the separator plate are sufficiently pressed against the separator plate even in the vicinity of the oxidant or fuel gas flow channel in the insulating portion. Therefore, the sealing characteristics are improved.

Embodiment 5

Figure 24:
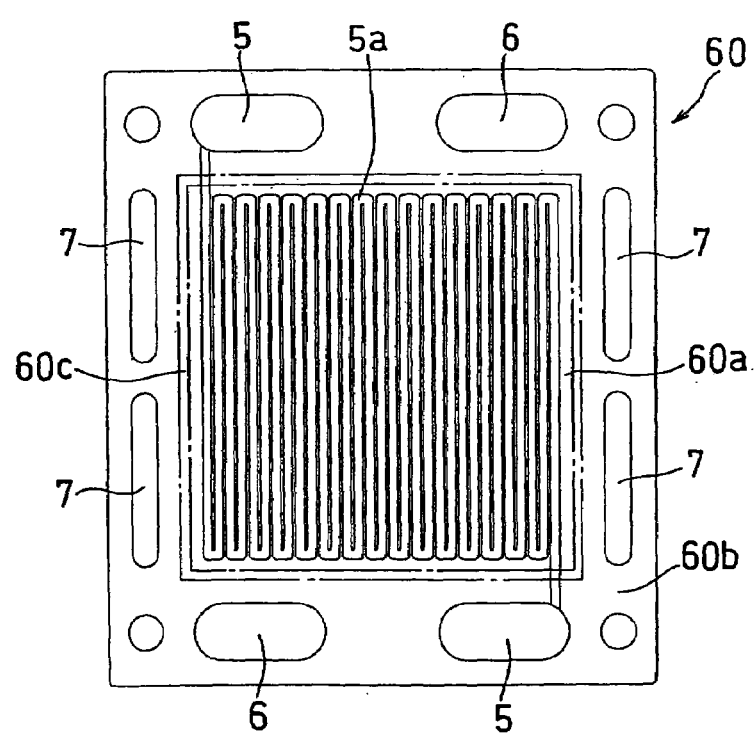
FIG. 24 is a front view of a separator plate in EMBODIMENT 5 of the present invention.

FIG. 24 illustrates a separator plate 60 with a third portion comprising resin between the electronic conductor portion and the insulating portion. The separator plate 60 serves both as an anode-side separator plate and a cathode-side separator plate.

The separator plate 60 is composed of: an electronic conductor portion 60a opposed to an anode or a cathode; an insulating portion 60b surrounding the electronic conductor portion 60a; and a third portion 60c between the electronic conductor portion 60a and the insulating portion 60b.

By providing the third portion between the electronic conductor portion and the insulating portion, the resins are melted and bonded at the interface between the electronic conductor portion and the third portion and at the interface between the third portion and the insulating portion, so that the joint between the electronic conductor portion and the insulating portion is improved.

Figure 25:
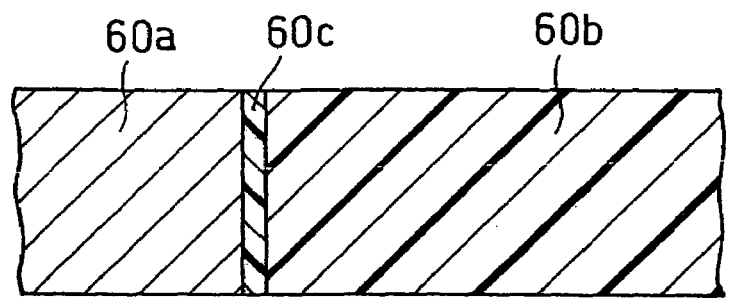
FIG. 25 is a cross-sectional view of the vicinity of a third portion of the separator plate of EMBODIMENT 5.
Figure 26:
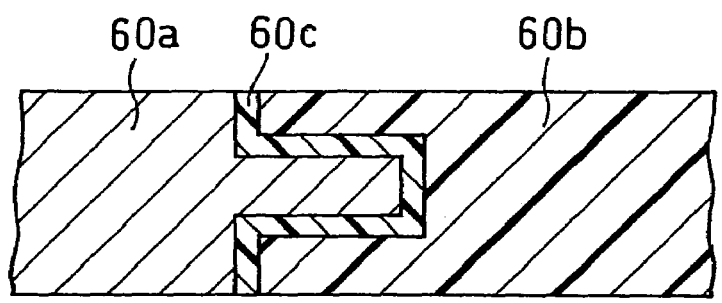
FIG. 26 is a cross-sectional view of the vicinity of a third portion of a second separator plate of EMBODIMENT 5.
Figure 27:
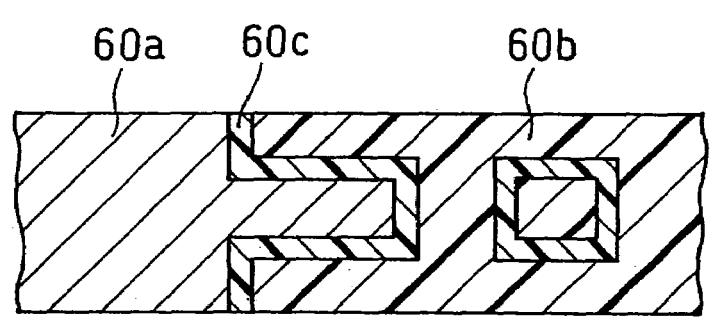
FIG. 27 is a cross-sectional view of the vicinity of a third portion of a third separator plate of EMBODIMENT 5.
Figure 28:
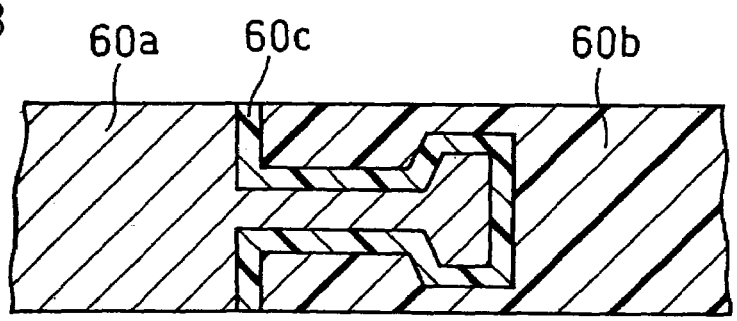
FIG. 28 is a cross-sectional view of the vicinity of a third portion of a fourth separator plate of EMBODIMENT 5.

The electronic conductor portion 60a and the insulating portion 60b are joined with the third portion 60C interposed between them in such a form as illustrated in FIG. 25, in which the three portions 60a, 60b and 60c are butt-joined in a straight line. In addition, it is also possible to join them as illustrated in FIGS. 26 to 28. In FIG. 26, the projected part of the electronic conductor portion 60a engages with the depressed part of the insulating portion 60b to form a joint with the third portion 60c interposed therebetween. In FIG. 27, the electronic conductor portion 60a is partially perforated to form a joint. In FIG. 28, the joint portion of the electronic conductor portion 60a is undercut to form a joint. In other words, the third portion is provided between the electronic conductor portion 10a and the insulating portion 10b in each of FIGS. 5 to 8.

Examples of the present invention are described below.

EXAMPLE 1

(i) Production of Separator Plate

Figure 1:
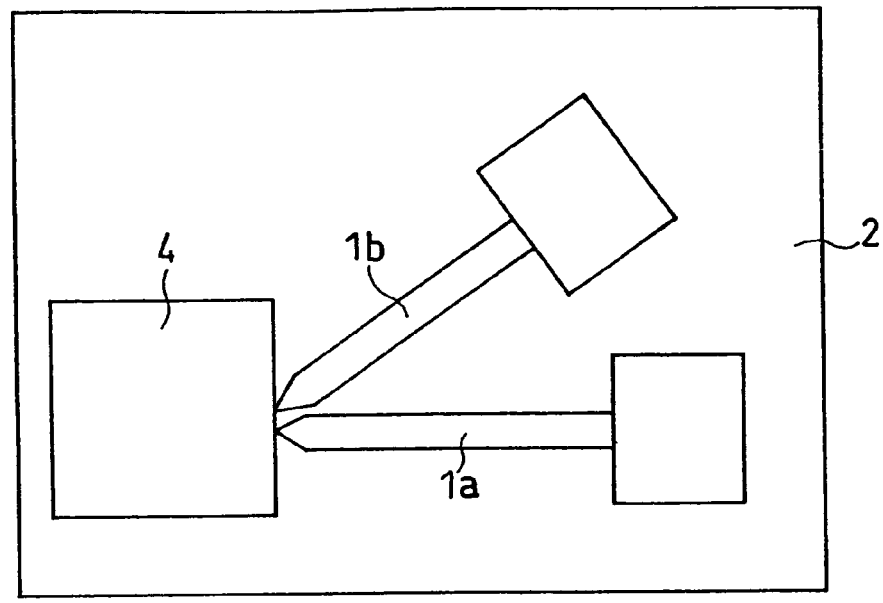
FIG. 1 is a top view of an injection molding machine equipped with two injection nozzles.
Figure 2:
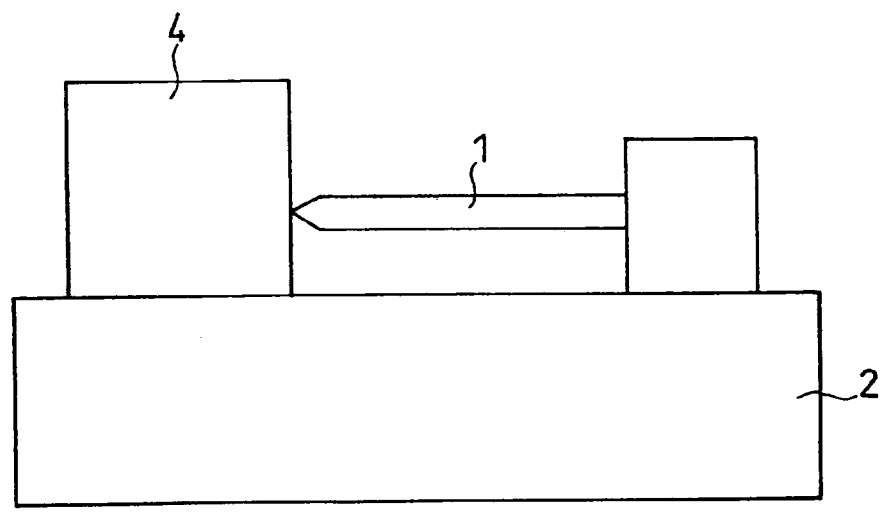
FIG. 2 is a side view of the injection molding machine equipped with two injection nozzles.

A compound for the electronic conductor portion and a compound for the insulating portion were introduced into an injection molding machine 2 as illustrated in FIGS. 1 and 2, which was equipped with two injection nozzles 1a and 1b capable of melting and kneading the compounds. Separator plates of predetermined shape, each composed of an electronic conductor portion and an insulating portion, were produced by molding the electronic conductor portion and thereafter molding the insulating portion. The compound for the electronic conductor portion was a mixture of graphite and PP (polypropylene) resin in a weight ratio of 7:3. The compound for the insulating portion was a mixture of PPS (polyphenylene sulfide) resin and glass filler in a weight ratio of 10:3.

A mold unit 4 was comprised of: a mold for molding the electronic conductor portion having flow channels of a fuel gas, an oxidant gas or cooling water at predetermined positions; and a mold for molding the insulating portion having manifold apertures. A conventional mold is generally composed of a material such as carbon tool steel (SK material) in view of molding tact time and strength. However, the separator plates of this example have a high heat conductivity and the hardening speed of the compound is therefore high, which lead to poor molding. Thus, as the mold, SUS 630, a material having a low heat conductivity, was used to ensure the moldability of the separator plates.

The molding conditions were as follows.

Mold temperature: 150° C.

Injection nozzle temperature: 260° C. for the compound for the electronic conductor portion, and 350° C. for the compound for the insulating portion Injection pressure: 1600 kgf/cm$^2$ Injection rate: 100 mm/sec for the compound for the electronic conductor portion, and 50 mm/sec for the compound for the insulating portion Injection time: 20 seconds Under the above-described conditions, three kinds of separator plates, i.e., the separator plate 10 of EMBODIMENT 1 and the separator plates 20 and 30 of EMBODIMENT 2, were produced.

These separator plates had a flow channel of the oxidant gas, fuel gas or cooling water in the electronic conductor portion. As the flow channel, a groove having a width of 1.5 mm and a depth of 1.0 mm was formed at pitches of 3 mm. The electronic conductor portion and the insulating portion had a thickness of 3 mm. Also, the electronic conductor portion and the insulating portion were joined in such a form as illustrated in FIG. 5, in which the two portions are butt-joined in a straight line.

(ii) Production of MEA

An electrode catalyst powder was prepared by placing platinum particles having an average particle size of approximately 30 Å on an acetylene black carbon powder in a weight ratio of 1:4. A dispersion of this catalyst powder in isopropanol was mixed with a dispersion of perfluorocarbon sulfonic acid powder in ethyl alcohol to form an electrode paste. Using this electrode paste as a raw material, an electrode catalyst layer was formed by screen printing on one side of a 250 µm thick carbon fiber nonwoven fabric, to produce an electrode. In the electrode catalyst layer, the content of platinum was 0.5 mg/cm$^2$, and the content of perfluorocarbon sulfonic acid was 1.2 mg/cm$^2$.

In this way, a positive electrode and a negative electrode were produced such that they had the same constitution. A hydrogen-ion conductive polymer electrolyte membrane was sandwiched between the positive electrode and the negative electrode such that the printed electrode catalyst layers faced inward, with gaskets fitted around the electrodes. The resultant assembly was hot pressed, to produce an electrolyte membrane electrode assembly (MEA). The hydrogen-ion conductive polymer electrolyte membrane was a thin film of perfluorocarbon sulfonic acid having a thickness of 25 µm.

(iii) Production of Fuel Cell

Using the three kinds of separator plates 10, 20 and 30 and the MEAs each composed of a hydrogen-ion conductive polymer electrolyte membrane 11 sandwiched between a cathode 12 and an anode 13 and gaskets 14, a plurality of unit cells were connected in series, as illustrated in FIG. 13. In connecting the unit cells, a cooling section was formed inside the separator plates by joining the separator plates 20 and 30 together such that the cooling water flow channels 7a of these two separator plates faced each other and formed one cooling water flow channel. Specifically, the cooling section was provided every two unit cells by alternately arranging the separator plate 10 and the cooling-section-forming separator plates 20 and 30 between the MEAs.

In the above-described manner, 50 unit cells were stacked to form a cell stack. Subsequently, a current collector plate and an insulating plate were joined to each end of the cell stack, and the resultant stack was sandwiched between stainless steel end plates and clamped with clamping rods at a pressure of 10 kgf/cm$^2$. This fuel cell was named cell A.

It is noted that changing the clamping pressure depending on the design of the gas flow channel is important, because too small clamping pressure leads to lowered cell performance due to outward leakage of the fuel gas and the oxidant gas and large contact resistance whereas too large clamping pressure results in electrode fracture and separator plate deformation.

The cell A was checked for leakage. The leakage check was performed by closing the outlet-side manifold aperture of the pair of manifold apertures, introducing a helium gas into the cell A from the inlet-side manifold aperture at a pressure of 0.5 kgf/cm$^2$, and measuring the flow rate of the gas which flowed into the cell A. As a result, no leakages of the air, fuel gas and cooling water were observed, which confirmed that the cell A had no problem with respect to the fluid sealing characteristics as a stacked fuel cell. Also, there was no problem with respect to the resin welded part produced around the manifold apertures upon fabrication.

COMPARATIVE EXAMPLE 1

Three kinds of separator plates having the same shapes as those of EXAMPLE 1 were produced by cutting a graphite plate having gas-tight isotropy. A conventional fuel cell was produced in the same manner as in EXAMPLE 1 except for the use of these separator plates. This fuel cell was named cell B.

Each of the cell A of EXAMPLE 1 and the cell B of COMPARATIVE EXAMPLE was retained at 85%, and a hydrogen gas humidified and heated to have a dew point of 83° C. was supplied to one of the electrodes while air humidified and heated to have a dew point of 78° C. was supplied to the other electrode. As a result, both of the cells exhibited an open-circuit voltage of 50 V at the time of no load when current was not output to outside.

Figure 14:
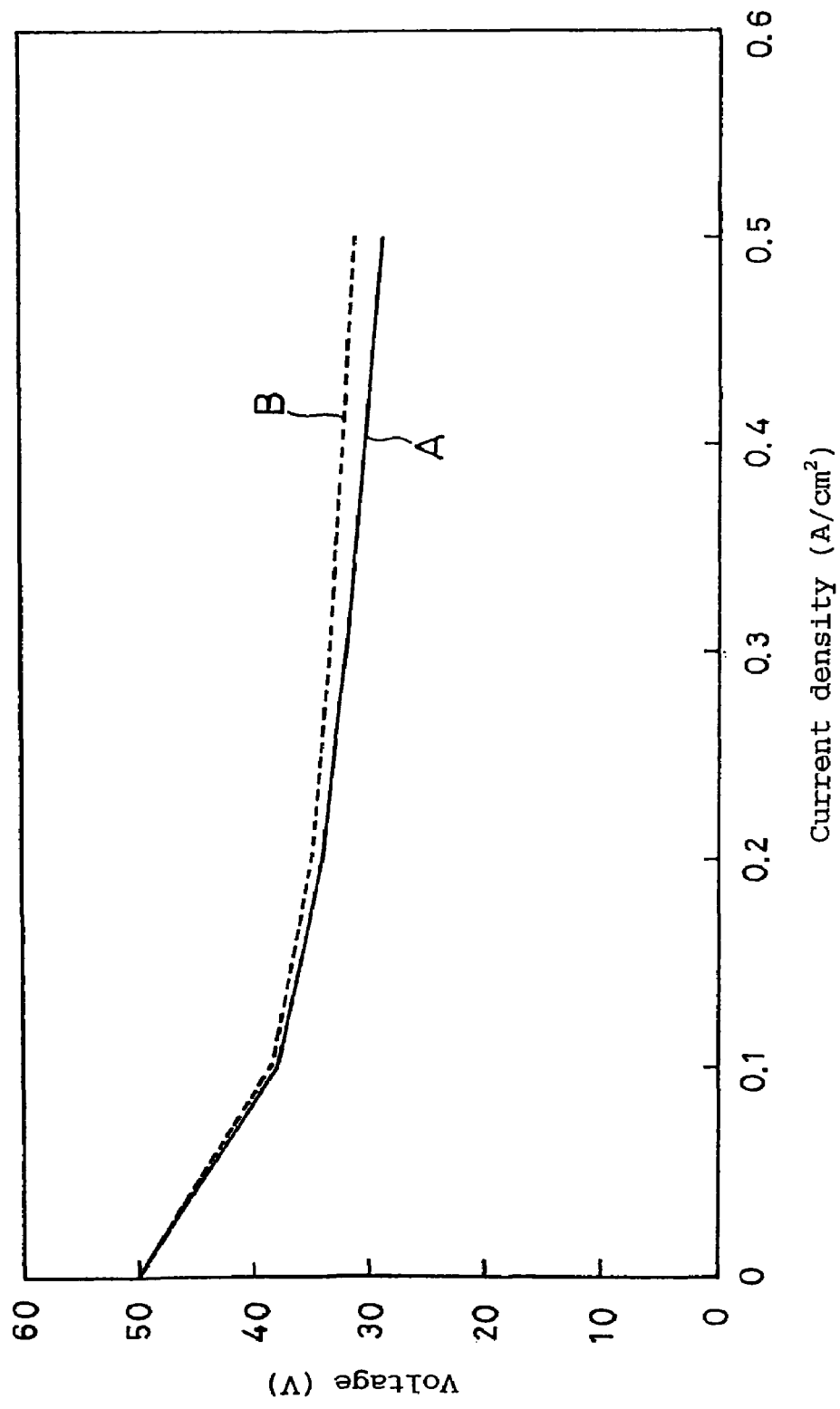
FIG. 14 is a graph showing the output characteristics of cell A of EXAMPLE 1 and cell B of COMPARATIVE EXAMPLE.

Also, the output characteristics of these cells were evaluated under the conditions of a fuel utilization of 80%, an oxygen utilization of 40% and a current density of 0.5 A/cm$^2$. As a result, it was confirmed that the cell A of EXAMPLE 1 had performance equivalent to that of the cell B of COMPARATIVE EXAMPLE, as shown in FIG. 14.

When the separator plates were molded using, for the insulating portion, the same compound as the compound for the electronic conductor portion, the compound was insufficiently filled into the mold, resulting in unsuccessful production of the separator plates of predetermined shape. Also, when the separator plates were molded using a compound for the electronic conductor portion of which PPS content was heightened to a level capable of sufficiently filling the compound, the resultant separator plates exhibited a high electric resistance of 300 to 500 mΩ·cm, resulting in lowered cell performance.

EXAMPLE 2

Three kinds of separator plates 10, 20 and 30 were produced in the same manner as in EXAMPLE 1 except that a mixture of graphite and PPS in a weight ratio of 7:3 was used as the compound for electronic conductor portion and that the injection nozzle temperature was 350° C. for the compound for the electronic conductor portion. A fuel cell was produced in the same manner as in EXAMPLE 1 except for the use of these three kinds of separator plates. This was named cell C.

The cell C of EXAMPLE 2 was checked for leakage in the same manner as in EXAMPLE 1. No leakages of the air, fuel gas and cooling water were observed, which confirmed that the cell C had no problem with respect to the fluid sealing characteristics as a stacked fuel cell. The pressure of the helium gas which flowed into the cell A of EXAMPLE 1 was 3 kgf/cm$^2$, while the pressure of the helium gas which flowed into the cell C of EXAMPLE 2 was 5 kgf/cm$^2$. It was therefore confirmed that the sealing characteristics of the separator plates of the cell C were improved.

The cells that were checked for leakage were observed. As a result, it was confirmed that the joint between the electronic conductor portion and the insulating portion was better in the separator plates of EXAMPLE 2 than in those of EXAMPLE 1. Also, there was no problem with respect to the resin welded parts produced around the manifold apertures upon fabrication.

The cell C of EXAMPLE 2 was supplied with the reactive gases under the same conditions as those of EXAMPLE 1. As a result, the cell C exhibited an open-circuit voltage of 50 V at the time of no load when current was not output to outside.

Figure 15:
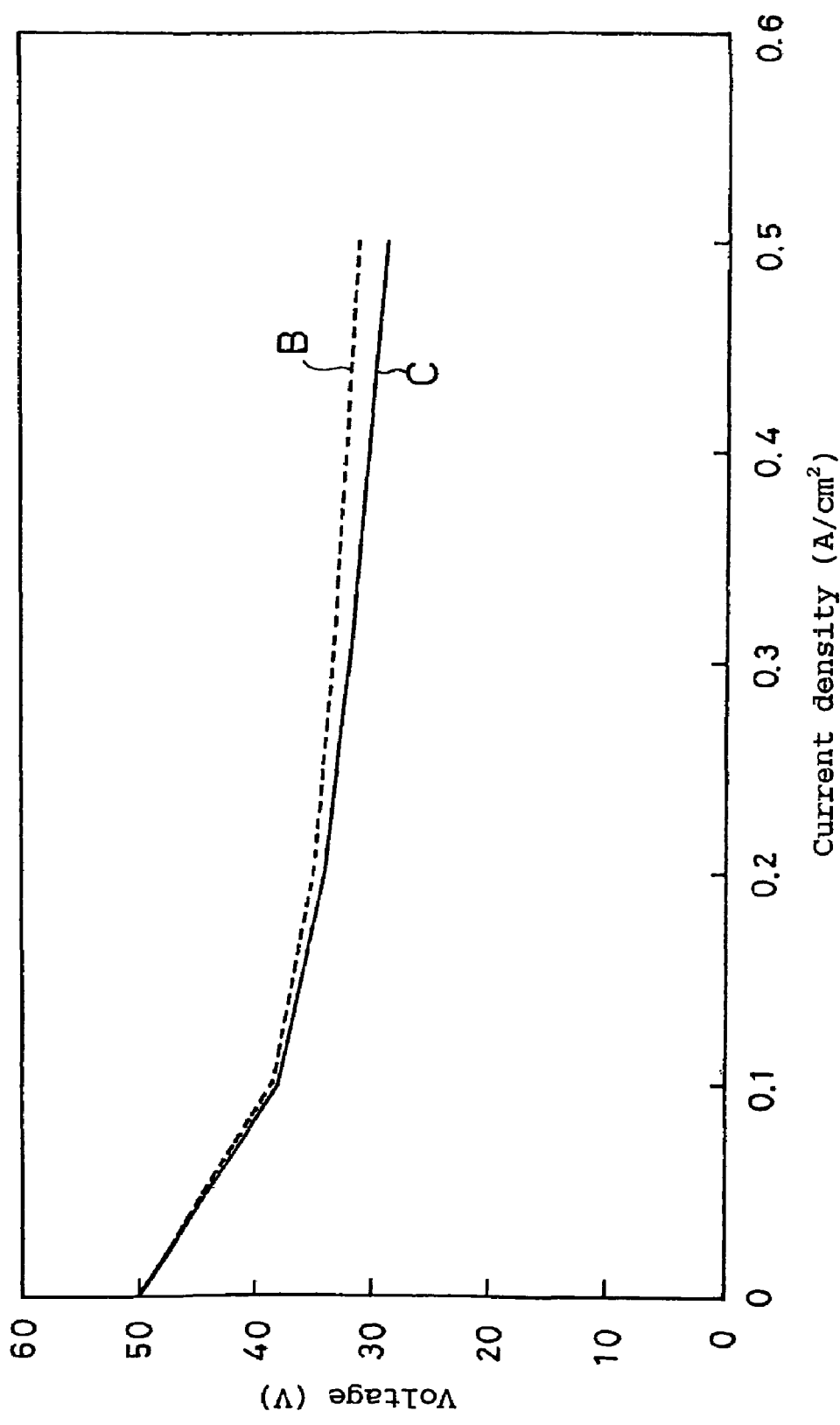
FIG. 15 is a graph showing the output characteristics of cell C of EXAMPLE 2 and cell B of COMPARATIVE EXAMPLE.

Also, the output characteristics of the cell C were evaluated under the same conditions as those of EXAMPLE 1. The evaluation results of the cell C as well as the cell B of COMPARATIVE EXAMPLE are shown in FIG. 15. It was confirmed that the cell C of EXAMPLE 2 had performance equivalent to that of the cell B of COMPARATIVE EXAMPLE.

EXAMPLE 3

(i) Production of Separator Plate

A compound for the electronic conductor portion and a compound for the insulating portion were introduced into the injection molding machine 2 as illustrated in FIGS. 1 and 2 in the same manner as in EXAMPLE 1, and separator plates of predetermined shape, each consisting of an electronic conductor portion and an insulating portion, were produced. The compound for the electronic conductor portion was a mixture of graphite and PPS resin in a weight ratio of 7:3. The compound for the insulating portion was a mixture of polystyrene resin and glass filler in a weight ratio of 10:3.

The mold unit 4 was comprised of: a mold for molding the electronic conductor portion having flow channels of a fuel gas, an oxidant gas or cooling water at predetermined positions; and a mold for molding the insulating portion having manifold apertures.

The molding conditions were as follows.

Mold temperature: 150° C.

Injection nozzle temperature: 350% for the compound for the electronic conductor portion, and 250% for the compound for the insulating portion Injection pressure: 1600 kgf/cm$^2$ Injection rate: 100 mm/sec for the compound for the electronic conductor portion, and 30 mm/sec for the compound for the insulating portion Injection time: 20 seconds Under the above-described conditions, the separator plate 40 of EMBODIMENT 3 as illustrated in FIGS. 16 and 17, which had ribs surrounding each of the manifold apertures on one side of the insulating portion and had corresponding grooves to receive the ribs on the other side of the insulating portion, was produced. A cathode-side separator plate and an anode-side separator plate to be used in combination with the separator plate 40 were also produced. When combined with each other, the cathode-side and anode-side separator plates form a cooling section and serve as a composite separator plate.

The cathode side of the cathode-side separator plate had the same structure as that of the cathode side of the separator plate 40 of EMBODIMENT 3. The cooling section side of this cathode-side separator plate had the same structure as that of the cooling section side of the cathode-side separator plate 20 of EMBODIMENT 2, but with grooves provided around the oxidant gas manifold apertures 5, fuel gas manifold apertures 6 and cooling water manifold apertures 7.

The anode side of the anode-side separator plate had the same structure as that of the anode side of the separator plate 40 of EMBODIMENT 3. The cooling section side of this anode-side separator plate had the same structure as that of the cooling section side of the anode-side separator plate 30 of EMBODIMENT 2, but with ribs provided around the oxidant gas manifold apertures 5, fuel gas manifold apertures 6 and cooling water manifold apertures 7.

(ii) Production of Fuel Cell

Gaskets were not used in this example. Using the three kinds of separator plates produced in the above manner and the MEAs of EXAMPLE 1 each consisting of the cathode, anode and hydrogen-ion conductive polymer electrolyte membrane, a plurality of unit cells were connected in series in the same manner as in EXAMPLE 1. In connecting the unit cells, a cooling section was formed inside the separator plates by joining the cathode-side separator plate and the anode-side separator plate together such that their cooling water flow channels faced each other and formed one cooling water flow channel. Specifically, the cooling section was provided every two unit cells by alternately arranging the separator plate 40 and the cooling-section-forming cathode-side and anode-side separator plates between the MEAs.

In this example, there was no need to use gaskets, because the insulating portion of each separator plate, made of the rubber-like, gas-tight elastic material comprising polystyrene, was capable of serving as the gasket.

In the above-described manner, 50 unit cells were stacked, and a fuel cell was assembled in the same manner as in EXAMPLE 1. This was named cell D.

The cell D was checked for leakage in the same manner as in EXAMPLE 1. No leakages of the air, fuel gas and cooling water were observed, which confirmed that the cell D had no problem with respect to the fluid sealing characteristics as a stacked fuel cell. It was also confirmed that the resin of the gas-tight elastic material used in the insulating portion had the same effect as the conventionally used gaskets. Also, there was no problem with respect to the resin welded parts produced around the manifold apertures upon fabrication.

The cell D of EXAMPLE 3 was supplied with the reactive gases under the same conditions as those of EXAMPLE 1. As a result, the cell D exhibited an open-circuit voltage of 50 V at the time of no load when current was not output to outside.

Figure 19:
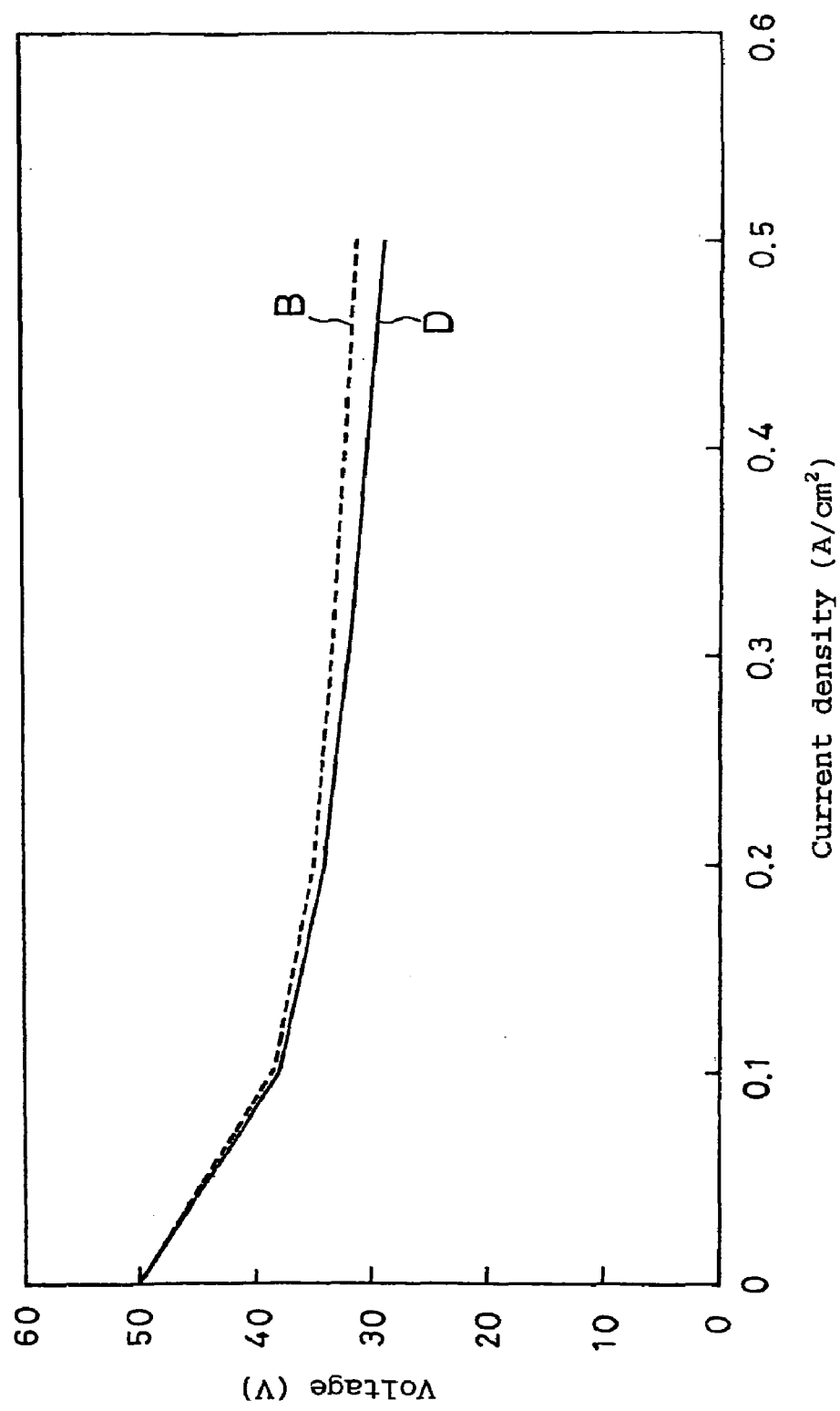
FIG. 19 is a graph showing the output characteristics of cell D of EXAMPLE 3 of the present invention and cell B of COMPARATIVE EXAMPLE.

Also, the output characteristics of the cell D were evaluated under the same conditions as those of EXAMPLE 1. The evaluation results of the cell D as well as the cell B of COMPARATIVE EXAMPLE are shown in FIG. 19. It was confirmed that the cell D of EXAMPLE 3 had performance equivalent to that of the cell B of COMPARATIVE EXAMPLE.

EXAMPLE 4

A compound for the electronic conductor portion and a compound for the insulating portion were introduced into the injection molding machine 2 as illustrated in FIGS. 1 and 2 in the same manner as in EXAMPLE 1, and separator plates of predetermined shape were produced. The compound for the electronic conductor portion was a mixture of graphite and PPS resin in a weight ratio of 7:3. The compound for the insulating portion was a mixture of PPS resin and glass filler in a weight ratio of 10:3.

The molds used were: a mold for molding the electronic conductor portion having flow channels of a fuel gas, an oxidant gas or cooling water; and a mold for molding the insulating portion having manifold apertures. A conventional mold is generally composed of a material such as carbon tool steel (SK material) in view of molding tact time and strength. However, the separator plates of this example have a high heat conductivity and the hardening speed of the compound is therefore high, which lead to poor molding. Thus, as the mold, SUS 630, a material having a low heat conductivity, was used to ensure the moldability of the separator plates.

The molding conditions were as follows.

Mold temperature: 150° C.

Injection nozzle temperature: 350° C. for both the compound for the electronic conductor portion and the compound for the insulating portion Injection pressure: 1600 kgf/cm$^2$ Injection rate: 100 mm/sec for the compound for the electronic conductor portion, and 50 mm/sec for the compound for the insulating portion Injection time: 20 seconds Injection molding was performed after mounting plate members of SUS 316 on the mold. Of the flow channel communicating with the pair of manifold apertures, a part of the flow channel formed in the insulating portion was covered by each plate member. In addition to SUS 316, corrosion-resistant stainless steel such as SUS 304L and SUS 316L, corrosion-resistant metal such as titanium, and resin may be used as the material of the plate member.

Under the above-described conditions, the separator plate 50 of EMBODIMENT 4 as illustrated in FIG. 20, serving both as an anode-side separator plate and as a cathode-side separator plate, was produced. A cathode-side separator plate and an anode-side separator plate to be used in combination with the separator plate 50 were also produced. When combined with each other, the cathode-side and anode-side separator plates form a cooling section and serve as a composite separator plate.

The cathode-side separator plate of this example had the same structure as that of the cathode-side separator plate 20 of EMBODIMENT 2, but the structure of its cathode side was modified to that of the cathode side of the separator plate 50 of EMBODIMENT 4. The anode-side separator plate of this example had the same structure as that of the anode-side separator plate 30 of EMBODIMENT 2, but the structure of its anode side was modified to that of the anode side of the separator plate 50 of EMBODIMENT 4.

A fuel cell was produced in the same manner as in EXAMPLE 1 except for the use of the three kinds of separator plates produced in the above manner. This was named cell E.

The cell E was checked for leakage in the same manner as in EXAMPLE 1. The leakage check was performed by closing the outlet-side manifold aperture, introducing a helium gas into the cell E from the inlet-side manifold aperture at a pressure of 0.7 kgf/cm$^2$, and measuring the flow rate of the gas which flowed into the cell E. No leakages of the air, fuel gas and cooling water were observed, which confirmed that the cell E had no problem with respect to the fluid sealing characteristics as a stacked fuel cell.

For the purpose of comparison, the cell C of EXAMPLE 2 was also checked for leakage in the same manner. The pressure of the helium gas which flowed into the cell C of EXAMPLE 2 was 5 kgf/cm$^2$, while the pressure of the helium gas which flowed into the cell E of EXAMPLE 4 was 7 kgf/cm$^2$. It was therefore confirmed that the sealing characteristics of the separator plates of the cell E were improved. The cause of this improvement is as follows. Of the flow channel communicating with the pair of manifold apertures of the separator plate, the plate members covered the parts of the flow channel formed in the gasket-opposing insulating portion, so that the gaskets were sufficiently pressed against the separator plate, resulting in an improvement in sealing characteristics. Also, there was no problem with respect to the resin welded parts produced around the manifold apertures upon fabrication.

The cell E of EXAMPLE 4 was supplied with the reactive gases under the same conditions as those of EXAMPLE 1. As a result, the cell E exhibited an open-circuit voltage of 50 V at the time of no load when current was not output to outside.

Figure 22:
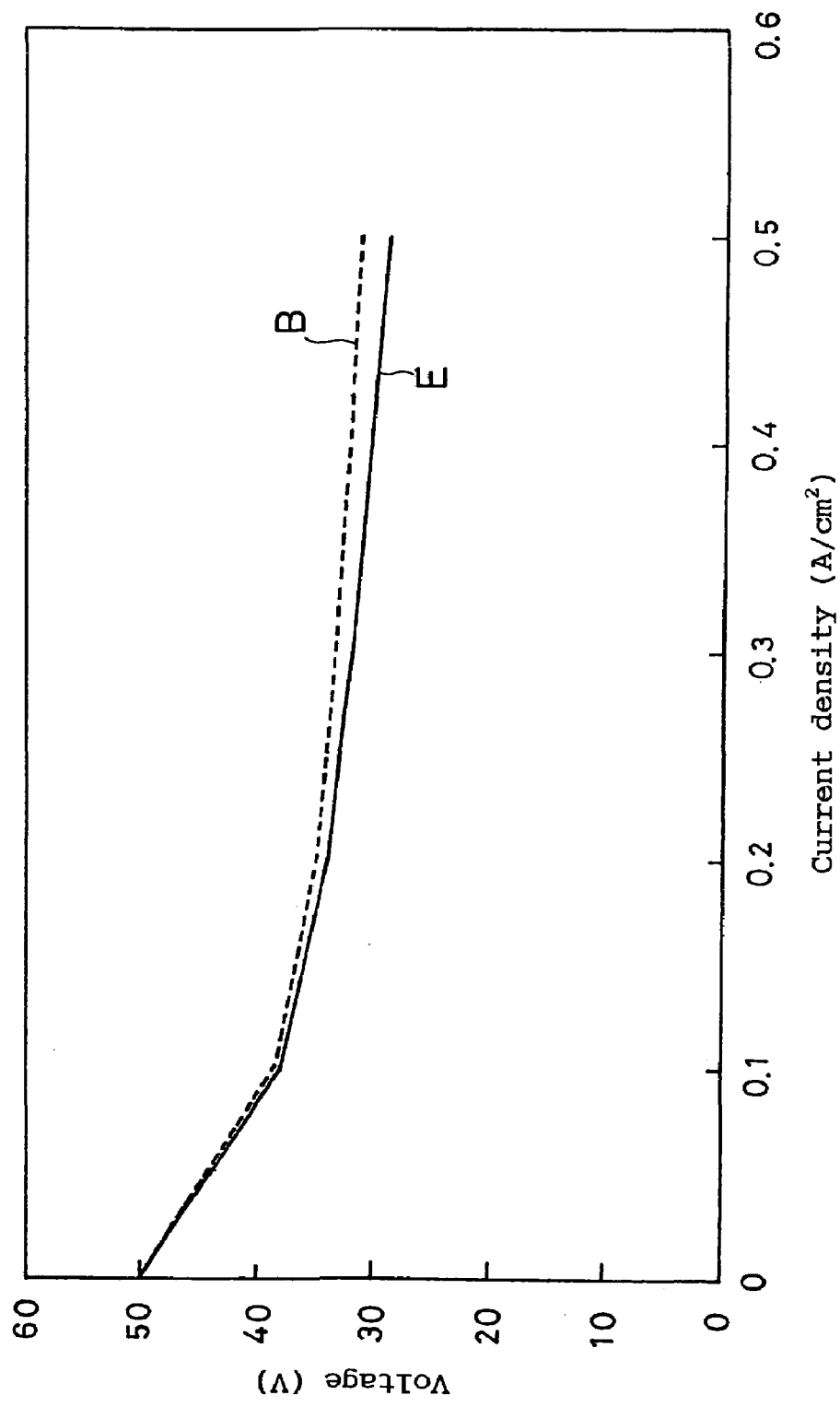
FIG. 22 is a graph showing the output characteristics of cell E of EXAMPLE 4 of the present invention and cell B of COMPARATIVE EXAMPLE.

Also, the output characteristics of the cell E were evaluated under the same conditions as those of EXAMPLE 1. The evaluation results of the cell E as well as the cell B of COMPARATIVE EXAMPLE are shown in FIG. 22. It was confirmed that the cell E of EXAMPLE 4 had performance equivalent to that of the cell B of COMPARATIVE EXAMPLE.

EXAMPLE 5

Figure 23:
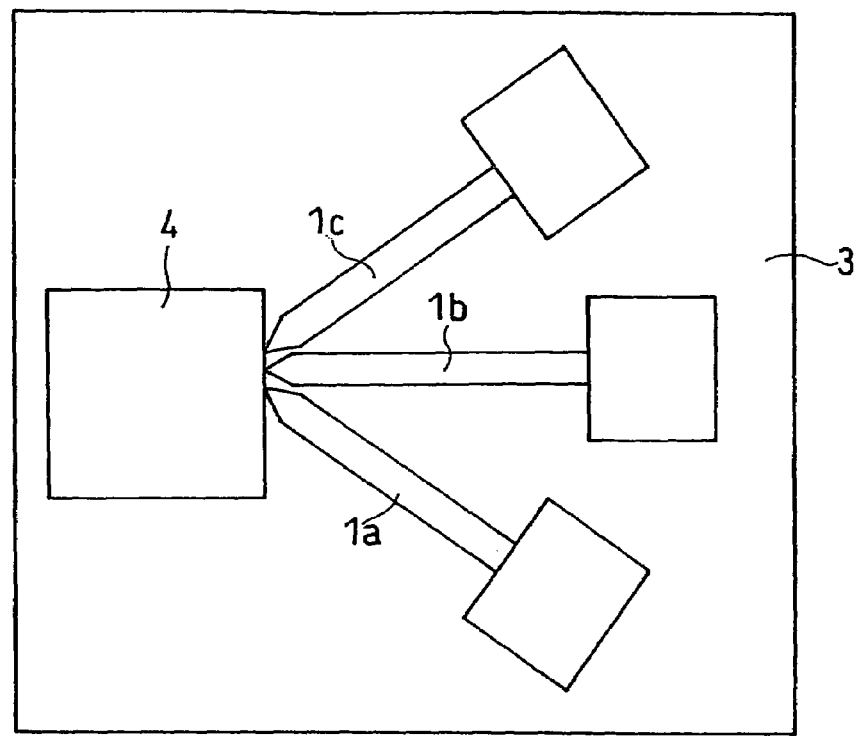
FIG. 23 is a top view of an injection molding machine equipped with three injection nozzles.

A compound for the electronic conductor portion, a compound for the insulating portion and a compound for the third portion were introduced into an injection molding machine 3 as illustrated in FIG. 23, which was equipped with three injection nozzles 1a, 1b and 1c capable of melting and mixing the compounds. Separator plates of predetermined shape were produced by multi-color multi-material injection molding. The compound for the electronic conductor portion was a mixture of graphite and PPS resin in a weight ratio of 7:3. The compound for the insulating portion was a mixture of polyamide resin and glass filler in a weight ratio of 10:3. Further, the compound for the third portion was a mixture of PPS resin and polyamide resin in a weight ratio of 1:1.

A mold unit 4 was comprised of: a mold for molding the electronic conductor portion having flow channels of a fuel gas, an oxidant gas or cooling water; and a mold for molding the insulating portion having manifold apertures. A conventional mold is generally composed of a material such as carbon tool steel (SK material) in view of molding tact time and strength. However, the separator plates of this example have a high heat conductivity and the hardening speed of the compound is therefore high, which lead to poor molding. Thus, as the mold, SUS 630, a material having a low heat conductivity, was used to ensure the moldability of the separator plates.

The molding conditions were as follows.

Mold temperature: 150° C.

Injection nozzle temperature: 350° C. for the compound for the electronic conductor portion and the compound for the third portion, and 280% for the insulating portion Injection pressure: 1600 kgf/cm$^2$ Injection rate: 100 mm/sec for the compound for the electronic conductor portion, and 50 mm/sec for the compound for the insulating portion and the compound for the third portion Injection time: 30 seconds Under the above conditions, three kinds of separator plates with the third portion formed between the electronic conductor portion and the insulating portion of the separator plates 10, 20 and 30 were injection molded. The electronic conductor portion, the insulating portion and the third portion of each separator plate had a thickness of 3 mm. The structure of the separator plate 10 with the third portion is the same as that of the separator plate 60 of EMBODIMENT 5 as illustrated in FIG. 24.

In this example, the electronic conductor portion and the insulating portion were joined with the third portion interposed between them in such a form as illustrated in FIG. 5, in which the three portions are butt-joined in a straight line.

A fuel cell was produced in the same manner as in EXAMPLE 1 except for the use of the three kinds of separator plates produced in the above manner. This was named cell F.

The cell F was checked for leakage. The leakage check was performed by closing the outlet-side manifold aperture, introducing a helium gas into the cell F from the inlet-side manifold aperture at a pressure of 7 kgf/cm$^2$, and measuring the flow rate of the gas that flowed into the cell F. No leakages of the air, fuel gas and cooling water were observed, which confirmed that the cell F had no problem with respect to the fluid sealing characteristics as a stacked fuel cell.

For the purpose of comparison, the cell C of EXAMPLE 2 was also checked for leakage. The pressure of the helium gas which flowed into the cell C of EXAMPLE 2 was 5 kgf/cm$^2$, while the pressure of the helium gas which flowed into the cell F of EXAMPLE 5 was 7 kgf/cm$^2$. It was therefore confirmed that the sealing characteristics of the separator plates of the cell F were improved.

The cell F was further checked for leakage in the same manner except that the helium gas was introduced at a pressure of 5 kgf/cm$^2$ from the inlet-side manifold aperture. For comparison, the cell A of EXAMPLE 1 was also checked for leakage in the same manner. The pressure of the helium gas was 3 kgf/cm$^2$ for the cell A of EXAMPLE 1, while it was 7 kgf/cm$^2$ for the cell F of EXAMPLE 5. It was therefore confirmed that the sealing characteristics of the separator plates of the cell F were improved.

The separator plates of EXAMPLE 5 subjected to the leakage check were observed. The joining faces of the electronic conductor portion and the third portion and the joining faces of the third portion and the insulating portion were melted and bonded. It was therefore confirmed that the separator plates of EXAMPLE 5 had a better joint between the electronic conductor portion and the insulating portion. Also, there was no problem with respect to the resin welded parts produced around the manifold apertures upon fabrication.

The cell F of EXAMPLE 5 was supplied with the reactive gases under the same conditions as those of EXAMPLE 1. As a result, the cell F exhibited an open-circuit voltage of 50 V at the time of no load when current was not output to outside.

Figure 29:
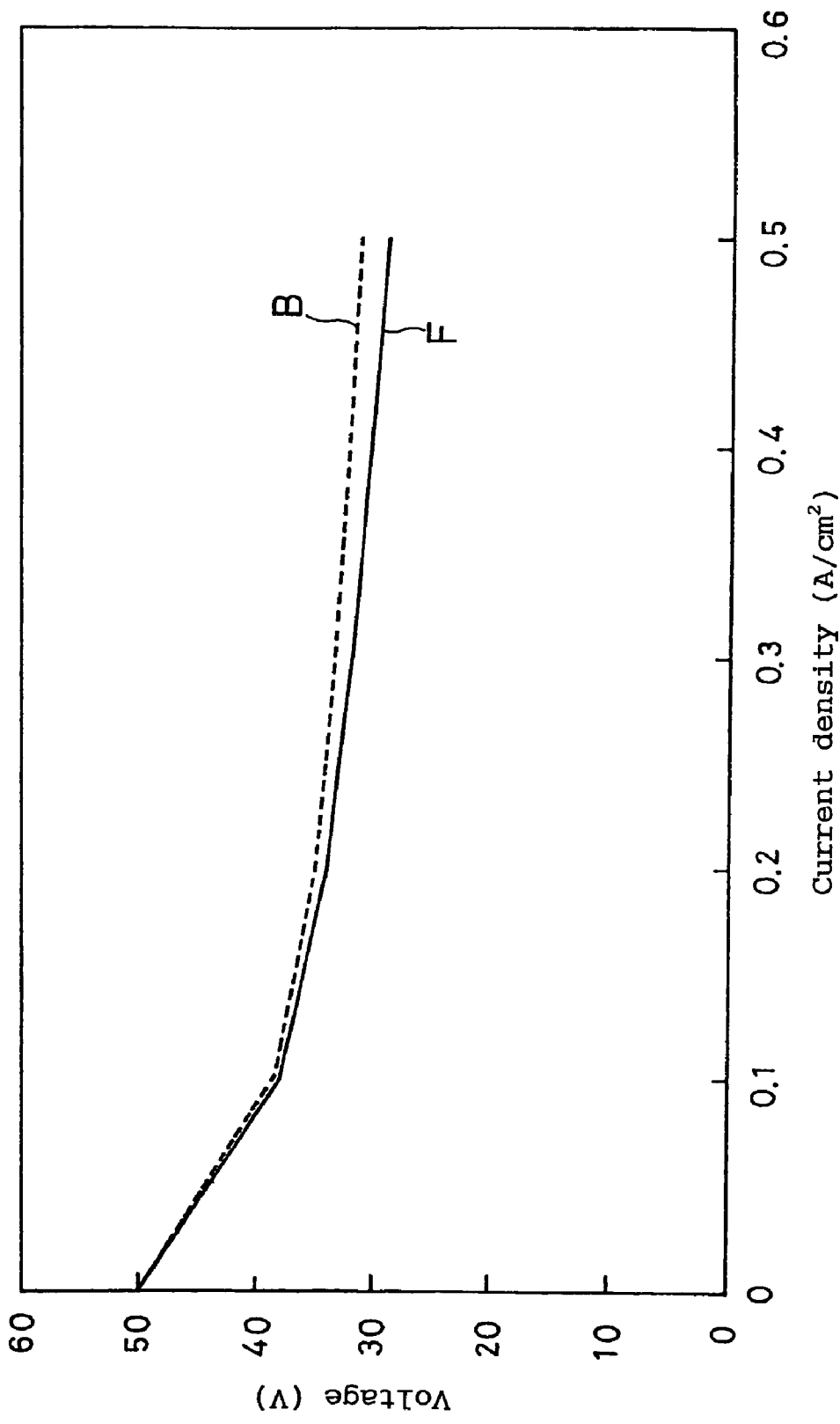
FIG. 29 is a graph showing the output characteristics of cell F of EXAMPLE 5 of the present invention and cell B of COMPARATIVE EXAMPLE.

Also, the output characteristics of the cell F were evaluated under the same conditions as those of EXAMPLE 1. The evaluation results of the cell F as well as the cell B of COMPARATIVE EXAMPLE are shown in FIG. 29. It was confirmed that the cell F of EXAMPLE 5 had performance equivalent to that of the cell B of COMPARATIVE EXAMPLE.

As described above, since the present invention uses different compounds for the electronic conductor portion and the insulating portion in injection molding a separator plate, the separator plate can have excellent conductivity and moldability. Also, the use of this separator plate makes it possible to obtain a polymer electrolyte fuel cell having excellent cell characteristics.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A separator plate for a polymer electrolyte fuel cell comprising:
    an electronic conductor portion containing conductive carbon;
    an insulating portion surrounding said electronic conductor portion, said electronic conductor portion having a first flow channel of a gas or cooling water on one side and having a second flow channel of a gas or cooling water on the other side, and
    a third portion between said electronic conductor portion and said insulating portion,
    wherein said third portion comprises a mixture of a material used in said electronic conductor portion and a material used in said insulating portion.

2. The separator plate for a polymer electrolyte fuel cell in accordance with claim 1, wherein said electronic conductor portion and said insulating portion are molded integrally, and said insulating portion has a pair of first manifold apertures communicating with said first flow channel and a pair of second manifold apertures communicating with said second flow channel.

3. The separator plate for a polymer electrolyte fuel cell in accordance with claim 1, wherein said third portion comprises an adhesive material.

4. The separator plate for a polymer electrolyte fuel cell in accordance with claim 1, wherein said electronic conductor portion and said insulating portion are injection molded.

5. The separator plate for a polymer electrolyte fuel cell in accordance with claim 1, wherein said electronic conductor portion comprises a mixture of an inorganic conductive filler and a resin.

6. The separator plate for a polymer electrolyte fuel cell in accordance with claim 1, wherein said insulating portion comprises a gas-tight elastic material.

7. The separator plate for a polymer electrolyte fuel cell in accordance with claim 1, wherein said insulating portion comprises a thermoplastic resin.

8. The separator plate for a polymer electrolyte fuel cell in accordance with claim 1, wherein said electronic conductor portion and said insulating portion comprise a resin having the same main molecular structure.

9. The separator plate for a polymer electrolyte fuel cell in accordance with claim 8, wherein said resin having the same main molecular structure is polyphenylene sulfide.

10. The separator plate for a polymer electrolyte fuel cell in accordance with claim 1, wherein the joint between said electronic conductor portion and said insulating portion has a cross-section which comprises a combination of a projection and a depression.

11. The separator plate for a polymer electrolyte fuel cell in accordance with claim 10, wherein said projection is formed on said electronic conductor portion.

12. The separator plate for a polymer electrolyte fuel cell in accordance with claim 1, wherein the electronic conductor portion and the insulating portion are joined by inserting one of the electronic conductor portion and the insulating portion into a hole formed in the other portion.

13. The separator plate for a polymer electrolyte fuel cell in accordance with claim 12, wherein said hole is formed in said electronic conductor portion.

14. A polymer electrolyte fuel cell comprising a cell stack, said cell stack including:
    a plurality of membrane electrode assemblies, each comprising a hydrogen-ion conductive polymer electrolyte membrane and an anode and a cathode sandwiching said electrolyte membrane; and
    a plurality of the separator plates that are stacked alternately with said membrane electrode assemblies,
    wherein each of said separator plates comprises:
    an electronic conductor portion containing conductive carbon;
    an insulating portion surrounding said electronic conductor portion, and
    a third portion between said electronic conductor portion and said insulating portion,
    wherein said third portion comprises a mixture of a material used in said electronic conductor portion and a material used in said insulating portion, and
    said electronic conductor portion has a first flow channel of a gas or cooling water on one side and has a second flow channel of a gas or cooling water on the other side.

* * * * *